(No Model.)

J. ROSLOSNIK.
VEGETABLE CUTTER.

No. 508,185. Patented Nov. 7, 1893.

WITNESSES:
Marion Hall
Kate Brennan

INVENTOR
John Roslosnik
BY
Jacques Jaeger
ATTORNEYS.

UNITED STATES PATENT OFFICE.

JOHN ROSLOSNIK, OF NEW YORK, N. Y.

VEGETABLE-CUTTER.

SPECIFICATION forming part of Letters Patent No. 508,185, dated November 7, 1893.

Application filed March 10, 1893. Serial No. 465,453. (No model.)

*To all whom it may concern:*

Be it known that I, JOHN ROSLOSNIK, a citizen of Austria-Hungary, residing in New York, county and State of New York, have invented certain new and useful Improvements in Vegetable-Cutters, of which the following is a specification.

This invention has reference to an improved vegetable cutter which is intended for cutting cabbage and other vegetables for supplying them during the cutting-action with a uniform quantity of salt in an automatic manner; and the invention consists of a vegetable cutter which comprises a supporting guide-board provided with a series of cutting knives, an open box reciprocated in guide-rails of said board, a perforated box at the under side of the guide-board for supplying the salt, said box being supported in keepers on the guide-boards, oscillating arms attached to staples at the outside of the guide-board, the ends of said arms being connected by springs to the salt-box and spring-actuated stops that are pivoted to the side-walls of the guide-box and adapted to engage the upper ends of the arms connected to the guide-board, so as to oscillate the same during the forward motion of the guide-box, while the stops are moved into recesses in the side-walls of the guide-box during the return motion of the same, so that with each forward motion of the guide-box a layer of salt is sprinkled over the layer of vegetables cut by the forward motion of the guide-box over the cutting-knives.

Figure 1:
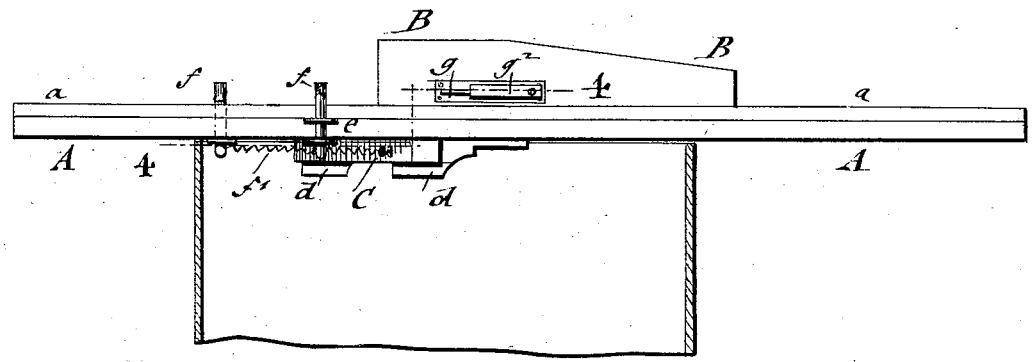
Figure 2:
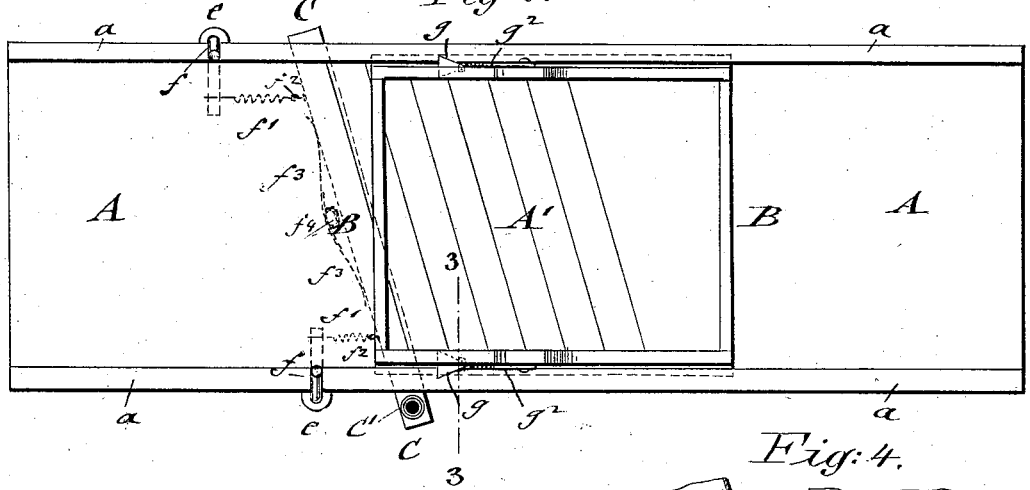
Figures 3, 4:
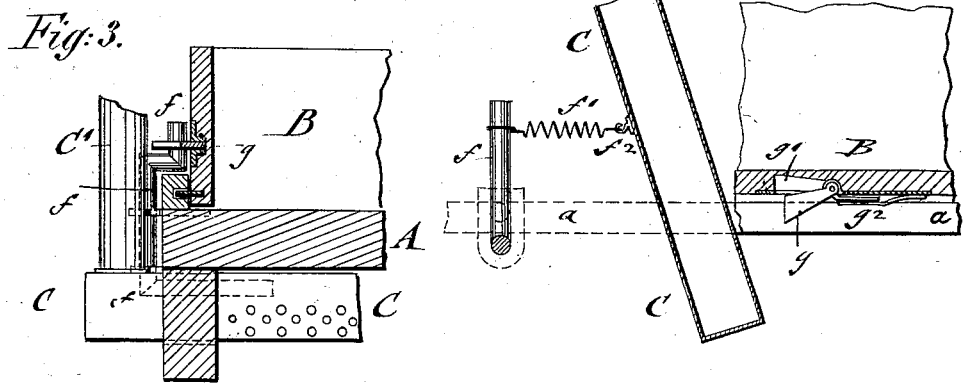

In the accompanying drawings, Figure 1, represents a side view of my improved vegetable cutter. Fig. 2, is a plan of the same. Fig. 3, is a vertical transverse section on line 3 3, Fig. 2, drawn on a larger scale, and, Fig. 4, is a horizontal section on line 4 4, Fig. 1, also being drawn on a larger scale.

Similar letters of reference indicate corresponding parts.

Referring to the drawings A represents the guide-board which is provided at its sides with longitudinal rails $a$, and B a guide-box which is guided by side-tongues in the grooves of the rails $a$ in the usual manner. The guide-board A is provided with a series of transverse, inclined cutting knives A' which are attached to the guide-board in the usual manner. The guide-box B within which the heads of cabbage or other vegetable to be sliced are placed, the cutting action taking place during the forward motion of the guide-box as the cabbage or other vegetable passes down upon the knives, is taken hold of at both sides by the hands and moved by the same in forward and backward direction over the guide-board A. A salt-box C is supported in keepers $dd$ that are attached to the under sides of the guide board A, the salt-box being preferably made of sheet metal and arranged at the same angle of inclination to the longitudinal axis of the guide-board A, as the cutting knives A'. The front-wall of the salt-box is provided with a number of perforations and one end of the same provided with a suitable tube C' to which the salt is supplied from a salt-bag or other receptacle that is suspended over the guide-board A in any suitable manner. At some distance from the salt-box C are supported in outside keepers or staples $ee$ of the guide-board A bent arms $ff$, the lower ends of which are connected by a spiral spring $f'$ with eyes or hooks $f^2$ on the rear wall of the salt box C. The bent arms $ff$ are not arranged opposite to each other on the guide-board A but equidistant from the ends of the salt-box C the upper inwardly bent ends of the arms $f$ being placed in the path of projecting stops $g$, that are pivoted to the side-walls of the guide-box B, so that when the guide-box is moved in a forward direction, the projecting stop $g$ at one side of the guide-boards B strikes first the upper end of the arm $f$ at one side of the guide-board, while when the guide-box is moved still farther back, the projecting stop $g$ at the opposite side of same strikes the upper end of the arm $f$, located at the opposite side of the guide-board. The salt-box C is further acted upon by flat springs $f^3$ which are attached to a center-pin $f^4$ at the under side of the guide-board A and which return the salt-box C quickly to its initial position in the keepers $d\ d$. The stops $g$ of the guide box B impart to the arm $f$ an oscillating motion, which oscillating motion is transmitted by the springs $f'$ to the salt-box, so as to impart in quick succession oscillating motions to the same and produce thereby in connection with springs $f^3$ the sudden discharge of a sprinkling of salt over the quantity of sliced vegetable cut off by the knives during the forward motion of the guide-box from the heads of cabbage or other vegetable in the same. At each forward motion of the guide-box, the salt-box is thus subjected to two quick oscillating motions so as to distribute a regular quantity of salt to the sliced vegetables.

When it is desired to reduce the quantity of salt supplied to the sliced vegetables, the guide-box is only moved far enough in a backward direction so as to oscillate one of the arms $f$. When a still smaller quantity of salt is to be supplied, some of the discharge-openings in the front-wall of the salt-box C may be closed by a slide-piece or other suitable arrangement (not shown in the drawings). During the return motion of the guide-box B the projecting stops $g$ are pressed into recesses $g'$ into the side-walls of the box B, as they pass over the upper ends of the arms $f$, so as to exert no oscillating action on the same. Each stop $g$ is provided with a backwardly extending shank which is acted upon by a spring $g^2$, so that the stops are always pressed in an outwardly projecting position. During the backward motion of the box B the stops clear the upper ends of the arms $f$, the springs $g^2$ serving for returning the stops into their outward position so that they are ready to engage the upper ends of the arms $f$ during the forward motion of the guide-box, and produce thereby the oscillations of the salt-box and the supply of salt to the sliced vegetables.

The vegetable-cutter may be used by being placed on a barrel or other receptacle into which the vegetables to be cut are collected and in which it is mixed with the salt as the cutting motion proceeds and the receptacle is gradually filled. The vegetable cutter may also be supported on a separate stand and canvas receptacle which is carried along for this purpose and from which the sliced and salted vegetables are transferred into the barrel in which it is to be preserved. By my improved vegetable-cutter, the fatiguing work of salting the cabbage that is cut up for sauerkraut, for instance, is dispensed with and thereby the time and labor necessary for this purpose saved. At the same time the salting of the vegetables is accomplished in a more uniform manner, owing to the uniform supply of salt that is distributed in regular succession over the different layers of the vegetables as the cutting action proceeds.

Having thus described my invention, I claim as new and desire to secure by Letters Patent—

1. A vegetable-cutter, composed of a supporting guide-board, a guide-box for the vegetables to be cut, a salt-box supported below the guide-board and means for oscillating the salt-box at each forward motion of the guide-box so as to sprinkle a small quantity of salt over that portion of the vegetables cut off during the forward motion of the guide-box, substantially as set forth.

2. A vegetable-cutter, composed of a supporting guide-board, a reciprocating guide-box for the vegetables to be cut, a salt-box supported in keepers at the under side of the guide-board, bent arms supported in keepers back of the salt-box, springs connecting the lower ends of the bent arms with the salt-box and pivoted and spring-actuated stops projecting from the side walls of the guide-box and adapted to engage the upper ends of the oscillating arms during the forward motion of the guide-box and clear the said arms during the return motion of the same, substantially as set forth.

3. The combination of a guide-board having transverse cutting knives, a guide-box guided on said board, a salt-box supported in keepers at the under side of the guide-board and provided with a perforated front-wall, oscillating arms having bent upper and lower ends supported in keepers of the guide-board back of the salt-box, springs connecting the lower ends of the arms with the rear-wall of the salt-box and spring-actuated stops pivoted to the side-wall of the guide-box and adapted to engage the upper ends of the oscillating arms so as to engage the same during the forward motion of the salt-box and distribute thereby a quantity of salt on the vegetables cut during the forward motion of the guide-box, substantially as set forth.

4. The combination of a guide-board having inclined cutting knives, a guide-box guided by the side-rails of the guide-board, keepers attached to the under side of the guide-board, a salt-box supported on said keepers parallel with the inclined cutting knives, bent oscillating arms supported in keepers of the guide-board equidistantly from the ends of the salt-box, springs connecting the lower ends of the arms with the salt-box and stops pivoted to the side-walls of the guide-box and adapted to oscillate the bent arms, the side-walls of the guide-box being provided with recesses for the stops and with springs acting on shanks of the stops so that the salt-box is subjected to one or two oscillations during the forward motion of the guide-box, but is not oscillated during the return motion of the guide-box, substantially as set forth.

In testimony that I claim the foregoing as my invention I have signed my name in presence of two subscribing witnesses.

JOHN ROSLOSNIK.

Witnesses:
PAUL GOEPEL,
CHARLES SCHROEDER.